UNITED STATES PATENT OFFICE.

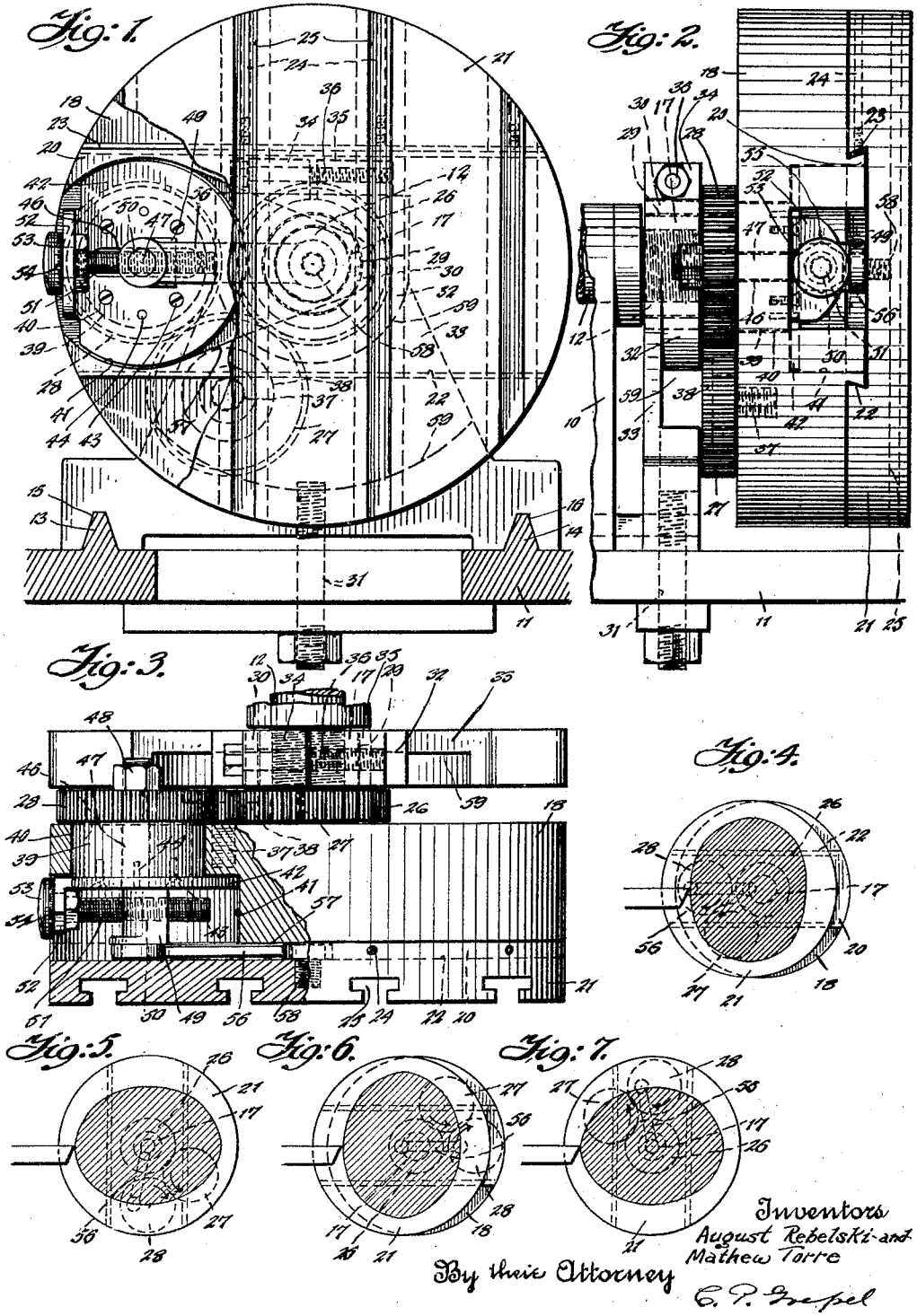

AUGUST REBELSKI, OF BROOKLYN, NEW YORK, AND MATHEW TORRE, OF HOBOKEN, NEW JERSEY.

OVAL CHUCK.

1,397,546.     Specification of Letters Patent.     Patented Nov. 22, 1921.

Application filed May 25, 1920. Serial No. 384,102.

*To all whom it may concern:*

Be it known that we, AUGUST REBELSKI, a citizen of the United States, and resident of the city of Brooklyn, in the county of Kings and State of New York, and MATHEW TORRE, a citizen of the United States, and resident of the city of Hoboken, in the county of Hudson and State of New Jersey, have invented certain new and useful Improvements in Oval Chucks, of which the following is a description.

The present invention relates to improvements in oval chucks, and has for its object to provide a machine capable of accurately producing an oval rotary movement. It may be here stated that we also desire to claim the mechanical movement disclosed herein for the purpose of producing oval rotary movement, and capable of more general use than its application to chucks.

An object of the invention is to provide a device of this character which may be adjusted with precision to vary the degree of the oval, that is, the relative proportions of the major and minor axes of the oval.

It is further proposed to enable the production of circular movement when desired, so that the machine embodying the improvements will find use in the carrying out of both circular and oval work.

With these and other objects in view, an embodiment of our invention is shown in the accompanying drawings, and this embodiment will be hereinafter more fully described with reference thereto, and the invention will be finally pointed out in the claims.

In the accompanying drawings:

Figure 1 is an elevation of the face of a chuck according to the present embodiment of our invention, with parts broken away.

Fig. 2 is a side view thereof.

Fig. 3 is a plane view thereof, in horizontal section.

Figs. 4, 5, 6 and 7 are diagrammatic views showing the positions of the chuck during one cycle of rotation and adjusted to produce an oval.

Similar reference characters indicate corresponding parts throughout the several figures of the drawings.

Referring to the drawings, and more particularly to Figs. 1 to 3 thereof, the embodiment of our invention shown therein is illustrated in connection with a lathe head stock 10 mounted upon the lathe bed 11, the spindle 12 thereof being provided with a screw-threaded extension to which the usual chuck for securing circular work is adapted to be attached. This circular work chuck is removed and the present improvements connected to the spindle as an attachment to the lathe.

The interiorly threaded hub 17 of the circular chuck head 18 is screwed upon the threaded end of the spindle. At the front side of the chuck head there is provided a guide rib 20 undercut or dove-tailed at its sides, and upon the front face of the head there is mounted a face plate 21 channeled, as at 22, to engage the rib 20, and having sliding movement along the chuck head in one direction. A bearing gib 23 is interposed between one side of the groove and one side of the rib, and is adjustable by means of screws 24, provided in the face plate. A plurality of T-slots 25 are provided in the face plate to enable the fastening of the work thereto by suitable clamping dogs. Any desired type of chuck or face plate may be employed.

At the rear side of the chuck head 18 there are provided a series of three gears, 26, 27 and 28 in planetary arrangement, the gear 26 being stationary and concentric to the axis of rotation of the chuck, the gear 28 being carried by the chuck, and in spaced relation to the gear 26, while the gear 27 is also carried by the chuck and meshes with the gears 26 and 28, this gear being an idle transmission gear. The gears 26 and 28 are of equal size, so that during a complete revolution of the chuck head about its axis, the gear 28 will be completely revolved in its bearing, or, in other words, the bearing will make a complete revolution about the gear, the gear being non-rotatable about its own axis.

The gear 26 is provided with a passage 29, through which the hub 17 extends, and is provided with a hub 30, clamped in a clamping head 32, provided upon a support 33, secured upon the bed plate in front of the head stock by a screw 31, and having grooves 15 and 16 engaging tracks 13 and 14 of the bed, and along which the support may be slidably moved upon loosening of the screw 31. The clamping head is split at its upper side, and provided with enlargements 34 and 35, having alined passages therethrough, engaged by a screw 36, adapted to tightly clamp the collar and gear 26 in fixed position. This construction permits of the accurate preliminary adjustment of the gear by first loosening the screw to enable the gear 26 to be turned.

The gear 27 is loosely mounted on the chuck head by means of a stud 37, having a countersunk head 38. The gear 28 is provided with an enlarged hub 39, rotatable in a circular passage 40, formed in the chuck head, this passage extending partially therethrough, and opening into a relatively larger circular pocket 41 in the front face of the chuck head beneath the face plate. A circular plate 42 is mounted in the pocket 41, and is secured to the hub 39 by means of screws 43 and dowels 44, the plate being of greater diameter than the hub, and adapted to retain the same in place against axial movement. The circular wall of the pocket 41 intersects the periphery of the chuck head, producing an exposed opening 45 in the periphery of said head.

A slot 46 extends through the plate 42, the hub 39 and the gear 28, and has disposed therein a shaft 47, screw-threaded at its rear end, and provided with a nut 48, and at its forward end there is formed a head 49, enlarged relatively to the width of the slot, and provided with a screw-threaded transverse hole 50, engaged by a micrometer screw 51, journaled and fixed against longitudinal movement in a bracket portion 52 bent outwardly from the plate 42. The head 53 of the screw is provided with graduated markings 54 upon its periphery, adapted to coöperate with an index 55 upon the bracket portion 52, the head being accessible, to be adjusted through the opening 45.

The head 49 of the shaft 47 has pivotally connected thereto one end of the lever 56, disposed in a recess 57 at the front of the chuck head, the sides of the recess being tangential to the opening 41, and converging to a point substantially beyond the center of the chuck, the other end of the lever being pivotally connected to a screw-threaded stud 58 provided centrally at the under side of the face plate 21.

The support 33 is provided with an arcuate passage 59, through which the nut 48 at the end of the shaft 47 moves during rotation of the chuck head, this passage being sufficiently wide to accommodate the said nut in any position of adjustment along the slot 46.

The operation of the chuck is as follows: In the position shown in Figs. 1 to 3 the shaft 47 is centrally disposed relatively to the gear 28, and in this position no shifting movement of the face plate takes place relatively to the chuck head, but the same rotates in a circular path in the manner of an ordinary lathe head.

When it is desired to produce an oval movement the micrometer screw is turned by means of the head 53, the nut 48 of the shaft 47 having previously been loosened, and thereby the shaft 47 is shifted in the slot 46 so that it is eccentrically disposed relatively to the axis of the gear 28, and at the same time through the lever 56 the face plate is shifted correspondingly upon the chuck head. The result is that during the rotation of the chuck head the end of the lever 56, pivotally connected to the shaft 47, is moved in a circular path about the center of the gear 28 and the face plate through its connection with the said lever 56, shifts toward the tool twice during each revolution of the chuck head, as clearly indicated in Figs. 4 to 7, so that during each revolution the work is moved in such relation to the tool that the major and minor radii of the oval are produced. By adjusting the micrometer screw it will be seen that an oval of any desired proportion may be produced within the capacity of the chuck.

As before pointed out, we do not propose to limit ourselves to the particular use of our invention upon the chucks of lathes, but we also desire to claim the new mechanical movement herein disclosed, and its application wherever desirable.

We have illustrated and described a preferred and satisfactory embodiment of our invention, but it is obvious that changes may be made therein within the spirit and scope thereof, as defined in the appended claims.

We claim:

1. In a device of the character described, a primary rotary member, a secondary member shiftably mounted relatively to said primary member, and rotatable therewith, rotatable means carried by said primary member, and adapted to have relative rotary movement during the rotation of said primary member, lever means connecting said secondary member to said rotatably carried means, the connection of said lever means with said rotatably carried means adapted to produce shifting movement of said secondary member during its rotary movement with said primary member.

2. In a device of the character described, a primary rotary member, a secondary member, shiftably mounted relatively to said primary member, and rotatable therewith, means rotatably carried by said primary member and adapted to be rotated during the rotation of said primary member, lever means connecting said secondary member to said rotatably carried means, the connection of said lever means with said rotatable carried means being adjustable between the axis and periphery thereof, and adapted, when eccentric to the axis of said means, to produce shifting movement of said secondary member, during its rotary movement with said primary member.

3. In a device of the character described, a primary rotary member, a secondary member shiftably mounted to shift in one direction relatively to said primary member, and rotatable therewith, means rotatably carried by said primary member and disposed between the axis and periphery thereof, transmission means adapted to cause relative rotation of said rotatably carried means in its bearing once for every revolution of said primary member about its axis, lever means connecting said secondary member to said rotatably carried means, the connection of said lever means with said rotatably carried means being in one position eccentric to said means to produce shifting movement of said secondary member during said rotary movement with said primary member.

4. In a device of the character described, a primary rotary member, a secondary member shiftably mounted relatively to said primary member, and rotatable therewith, means rotatably carried by said primary member, and adapted to be rotated during the rotation of said primary member, lever means connecting said secondary member to said rotatably carried means, a micrometer screw engaging the connection of said lever means with said rotatably carried means, and adapted to adjust the same between the axis and periphery thereof, said lever, when eccentrically connected to said rotatable carried means, adapted to produce shifting movement of said secondary member during its rotary movement with said primary member.

5. In a device of the character described, a primary rotary member, a secondary member shiftably mounted relatively to said primary member, and rotatable therewith, means rotatably carried by said primary member and disposed between the axis and periphery thereof, a gear carried by said rotary means, a stationary gear disposed concentrically to the axis of said primary member, a transmission gear mounted upon said rotary member and meshing with said first-mentioned gear and said stationary gear, said gears adapted to cause relative rotation of said rotatably carried means in its bearing once for every revolution of said rotary means about its axis, lever means connecting said secondary member to said rotatably carried means, the connection of said lever means with said rotatably carried means being in one position eccentric thereto, and adapted to produce shifting movement of said secondary member during its rotary movement with said primary member.

6. A device of the character described, comprising a primary rotary member, a secondary member shiftably mounted relatively to said primary member and rotatable therewith, rotatable means carried by said primary member, stationary gear means adapted to cause relative rotation of said rotatably carried means in its bearing once for every revolution of said primary means about its axis, means adapted to permit the adjustment of said stationary gear means, lever means connecting said secondary member to said rotatably carried means, the connection of said lever with said means being in one position eccentric thereto and adapted to produce shifting movement of said secondary member during its rotary movement with said primary member.

7. A mechanical movement comprising a primary rotary member, a secondary member adapted to have shifting movement in one direction relatively to said primary member and rotatable therewith, means rotatably carried by said primary member and adapted to be relatively rotated in its bearing once for every revolution of said primary means about its axis, lever means connected at one side to the center of said secondary member and connected at its other end to said rotatably carried means, and adapted to produce shifting movement of said secondary member during its rotary movement with said primary member.

8. A mechanical movement comprising a primary rotary member, a secondary member adapted to have shifting movement in one direction relatively to said primary member and rotatable therewith, means rotatably carried by said primary member and adapted to be relatively rotated in its bearing once for every revolution of said primary means about its axis, lever means connected at one side to the center of said secondary member and connected at its other end to said rotatably carried means and being in one position eccentric to the latter, and adapted to produce shifting movement of said secondary member during its rotary movement with said primary member, and means adapted to permit the adjustment of the connection of said lever means with said rotary means.

In testimony that we claim the foregoing as our invention, we have signed our names hereunder.

AUGUST REBELSKI.
MATHEW TORRE.